United States Patent [19]

Plummer

[11] Patent Number: 4,681,427
[45] Date of Patent: Jul. 21, 1987

[54] ELECTRONIC PRINTING METHOD
[75] Inventor: William T. Plummer, Concord, Mass.
[73] Assignee: Polaroid Corporation, Cambridge, Mass.
[21] Appl. No.: 854,926
[22] Filed: Apr. 23, 1986

Related U.S. Application Data

[63] Continuation-in-part of Ser. No. 730,828, May 6, 1985, Pat. No. 4,610,536.

[51] Int. Cl.⁴ .................. H04N 1/46; G03B 33/12
[52] U.S. Cl. .......................... 355/32; 355/37; 355/38; 355/67; 355/8; 358/75
[58] Field of Search .................. 355/1, 3 R, 32, 8, 37, 355/38, 67, 4, 68, 77; 358/75, 63, 78, 44, 80, 53, 199, 285; 178/15

[56] References Cited

U.S. PATENT DOCUMENTS

| | | | |
|---|---|---|---|
| 3,622,690 | 11/1971 | Stephens et al. | 178/5.2 R |
| 4,175,856 | 11/1979 | Pone, Jr. | 355/68 |
| 4,206,998 | 6/1980 | Tokuda | 355/77 |
| 4,371,260 | 2/1983 | Yoshimoto et al. | 355/77 |
| 4,610,536 | 9/1986 | Smyth et al. | 355/38 |

Primary Examiner—A. C. Prescott
Attorney, Agent, or Firm—Francis J. Caufield

[57] ABSTRACT

An electronic printing method by which originals are photographically reproduced by exposing high-contrast copy material with an intensity modulated illumination source that coarsely scans the original while the original is sharply imaged with a well-corrected optical system. The source intensity is modulated to compensate for the original's tonal qualities and electronically shapes the response of the copy material to enhance tonal reproduction. The imaging system in conjunction with the high-contrast material assures high reproduction of detail. The method enhances copy sharpness and reduces copy time, memory and computational needs otherwise required for copies of comparable quality.

8 Claims, 3 Drawing Figures

ELECTRONIC PRINTING METHOD

CROSS-REFERENCE TO RELATED APPLICATION

This is a continuation-in-part of U.S. patent application Ser. No. 730,828, filed May 6, 1985, now U.S. Pat. No. 4,610,536.

BACKGROUND OF THE INVENTION

This invention in general relates to electronic printing and in particular to an electronic printing process in which high-contrast film is used to make copies of original pictorials.

Electronic printing is well-known and refers to a method in which a flying spot scanner, instead of a continuous light source, is used to photographically make copies of original pictorial materials.

In the usual photographic copying process used to make enlargements or contact prints, a continuous, more or less uniform source evenly illuminates all parts of the negative simultaneously for some appropriate exposure interval arrived at either through trial and error but more likely by automated means.

In electronic printing, the flying spot (typically an electron beam moving over the surface of a cathode ray tube) is the light source. Here, the image is formed by exposure of one spot of the negative at a time like the image in a television screen is formed. During the exposure, the scanning beam moves over the whole negative area in a raster pattern that assures that the spot passes over every point in the negative for the same length of time.

In electronic printing systems, the intensity of the electron beam is controlled according to the density of the negative area that the beam is passing over at any instant. To accomplish this, the light coming through the negative is monitored by a photodetection system whose output is fed back into the circuit controlling the scanning spot intensity. With no feedback, the spot remains uniformly bright all the time as with a continuous light source. With 100% negative feedback, the spot intensity automatically compensates for variations in negative density, and the resulting print is uniformly gray. With excessive positive feedback, contrast between light and dark areas can be exaggerated, at the expense of a realistic tonal range. Between these two extremes of feedback, there are intermediate degrees which produce prints of lower or higher contrast so that negatives of varying degrees of contrast can be printed on a single grade of paper, usually of low contrast. Moreover, this system of contrast control reduces the overall tone range of the negative image without reducing the fine detail contrast to the same extent. However, the detail reproduction is limited, of course, by the size of the flying spot which, if large, reduces detail and, if smaller, enhances detail.

Hence, prints produced in an electronic enlarger reproduce all of the fine detail, even of very contrasty negatives without exceeding the contrast range of the paper. The effect of the flying spot scanner exposure is that of an unsharp, contrast reducing mask which is virtually a luminance positive low contrast image of the negative being printed and produced during the printing exposure.

The principle underlying electronic printing can be used for producing either black and white photographs or color photographs from color negatives. Color negatives are printed by three successive exposures through a red, green and blue tricolor filter. During each exposure, the photodetector reads through a complementary colored filter to provide the necessary feedback control.

Scanning light sources need not be confined to just the electron beam of a cathode ray tube. Laser scanning and printing apparatus are also well known for electronic printing. One example, which utilizes a laser to simultaneously provide a first laser beam for scanning an original pattern to derive pattern signals corresponding to the tones on the original pattern, and a second laser beam for projecting recording light onto a recording medium, is disclosed in U.S. Pat. No. 3,622,690 entitled "Electronic Scanner Utilizing a Laser for the Simulaneous Scanning and Reproducing of Images" by A. Stephens et al, issued Nov. 23, 1971. This patent also discloses a color correction computer to correct for deficiencies in the printing dyes. Thus, pictorial materials are scanned in laser light and converted to elecronic signal information by photoresponsive devices which detect the scanning beam. The electronic signal information is then modified by appropriate algorithms to provide an enhanced image on the printing of the reproduction. During the printing process, the laser light, modulated in accordance with the enhanced signal information, is line scanned aross the surface of the reproduction material to directly expose a duplicate image of the oiriginal pattern. Since the laser light is utilized to directly scan and expose the photosensitive material for the reproduction, the original pictorial material must be line scanned and sensed in high resolution in order to provide a high resolution duplicate. Consequently, the resolution of the duplicate image is no greater than the resolution at which the original pictorial materials are scanned.

Line scanning an original pattern or picture in high resolution to provide image data for minute picture elements or pixels results in the generation of an enormous amount of data needed to define the image in such fine detail. When converted to digital format, this data occupies a considerable amount of memory storage and requires considerable processing capability when electronic image enhancements, such as color correction, are incorporated into the system to provide high quality electronic images. Consequently, one is faced with either the prospect of a very large, fast computer or a smaller, slower clock computer that requires longer image processing, and thus, copy time.

Another possibility, described in the parent of this application, Ser. No. 730,828, filed May 6, 1985, involves a low resolution scanning system along with an optical imaging system, both of which operate in conjunction with one another to reduce the image data requirements while at the same time providing the possibility for high resolution copies. The strategy of the system described in that application was to divide the illumination and imaging tasks between two separate components of the system. However, to fully exploit this strategy, it has been discovered that use must be made of high-contrast copy materials as described in the detailed disclosure which follows.

Therefore, it is a primary object of this invention to provide a method in which an electronic scanning and printing apparatus is used in conjunction with high-contrast film to provide sharpness enhanced image duplicates of an original picture that is scanned in low resolution to provide only a minimal quantity of image illumination data.

It is a further object of this invention to provide a method in which a laser scanning and printing apparatus is used to make sharpness enhanced duplicates of an original by scanning the original in low resolution.

Other objects of the invention will in part be obvious and will in part appear hereinafter. The invention accordingly comprises the method possessing the combination of steps which are exemplified in the following detailed disclosure.

SUMMARY OF THE INVENTION

An electronic printing method by which originals are photographically reproduced. An original is coarsely scanned for tonal properties and, while sharply imaged on high-contrast copy material, is exposed by coarsely scanning with an intensity modulated source. During exposure, the variation of the source intensity electronically shapes the effective response of the copy material to enhance tonal reproduction in the copy.

The imaging system (lens) in conjunction with the high-contrast material assures high reproduction of visible details in the original since both have comparable spatial frequency responses where the visual system is sharpest.

With the method, copy sharpness is enhanced while advantageously copy time, memory and computational needs are reduced compared with other methods for making copies of comparable quality.

DESCRIPTION OF THE DRAWINGS

The novel features that are considered characteristic of the invention are set forth with particularity in the appended claims. The invention itself, however, together with other objects and advantages thereof will be best understood from the following description when read in connection with the accompanying drawings wherein:

DESCRIPTION OF THE PREFERRED EMBODIMENT

This invention is a method for electronically printing copies of original pictorials, in either black and white or color, although color is emphasized. The method reduces copy times and data storage and computational needs compared with other reproduction methods yielding similar quality copies. This is accomplished by the use exclusively of high-contrast copy material in conjunction with a well-corrected imaging system and a coarse scanning system which is used for deriving tonal information from the original and for exposing it afterwards with a modulated intensity.

Figure 1:
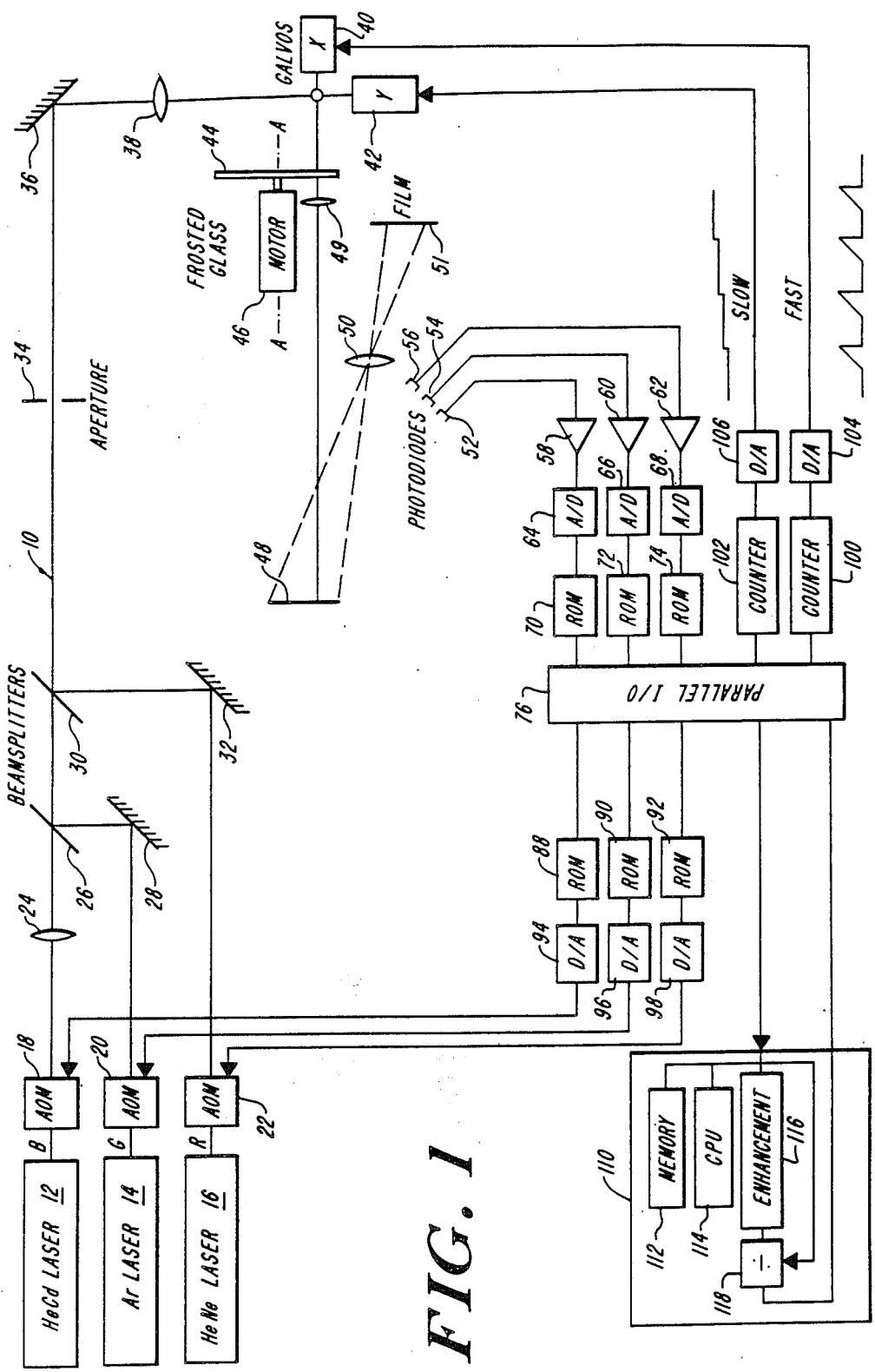
FIG. 1 is a schematic block diagram of a laser scanning and printing apparatus employed in practicing the invention.

Referring to FIG. 1, there is shown generally at 10 a laser scanning and printing apparatus used in the practice of this invention. Apparatus 10 comprises three coherent laser light sources 12, 14 and 16. Laser light source 12 comprises a helium cadmium laser for providing a blue beam of light; laser light source 14, an argon laser for providing a green beam of light; and laser light source 16, a helium neon laser for providing a red beam of light. The output light beams from laser light sources 12, 14 and 16 are modulated respectively by acousto-optic modulators 18, 20 and 22. The blue laser light beam emanating from the light modulator 18 is directed by way of a non-achromatic positive lens 24 to a dichroic mirror 26 wherein it is combined with the green laser light beam reflected to the dichroic mirror 26 by a reflecting surface 28. The composite blue-green laser light beam is thereafter directed to a dichroic mirror 30 wherein it is combined with the red laser light beam reflected to the dichroic mirror 30 by another reflecting surface 32.

The composite blue-green-red laser light beam is thereafter directed through an aperture 34 which blocks unwanted diffracted orders. The composite light beam is thereafter reflected from another reflecting surface 36 for transmission through another non-achromatic positive lens 38 to a pair of XY galvanometer mirrors as shown generally at 40 and 42. The composite colored laser light beam is reflected by the XY galvanometer mirrors 40, 42 through a ground or frosted glass 44 which is rotatably driven about axis AA by a motor 46. The ground glass 44 operates to change the composite colored laser light beam from coherent light to incoherent light for reasons which will become apparent from the following discussion. The spot of light projected onto the ground glass 44 is thereafter focused by an achromatic positive lens 49 onto an original picture receiving plane as shown at 48.

Figure 3:
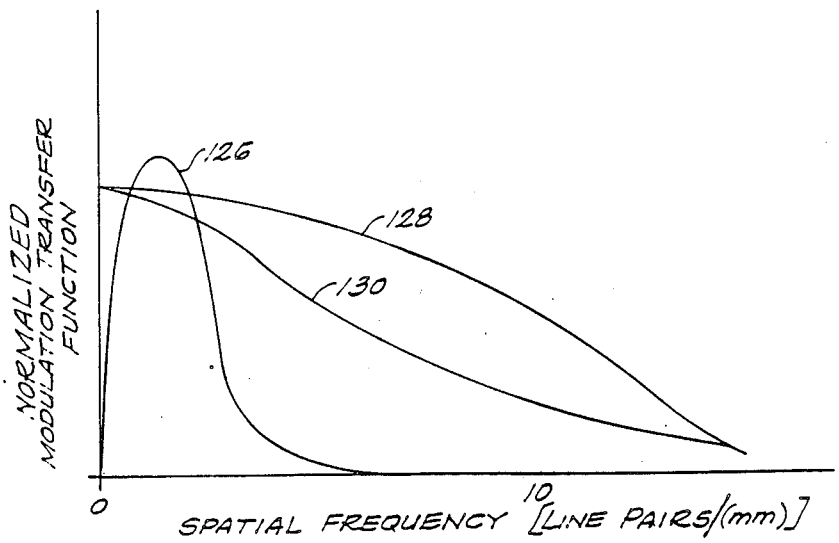
FIG. 3 is a schematic graph of normalized modulation transfer functions for the human visual system along with those for low- and high-contrast copy materials.

The light reflected from the picture plane 48 is directed by a positive objective lens 50 to a film plane 51 on which a high-contrast (i.e., steep-sloped) photosensitive copy material may be stationed. Lens 50 is preferably a copy lens well-corrected for control of aberrations, including chromatic, over a wide field. Its transmission characteristics are selected in a well-known manner for transmission of the full range of spatial detail in the orignal pictorial and especially those spatial details whose frequency is within the bandpass region of the human visual system as shown by curve 126 in FIG. 3.

Note also that the center of picture plane 48 and the optical axis of lens 50 are offset. This is done to minimize the contrast reducing effects of specularly reflected glare during the copying process.

Light reflected from picture plane 48 is also received by three photoresponsive elements 52, 54 and 56. Photoresponsive element 56 is filtered to detect only reflected blue light, photoresponsive element 54 to detect only reflected green light and photoresponsive element 52 to detect only reflected red light. Each of the photoresponsive elements 52, 54 and 56 provides an analog electronic information signal corresponding to the intensity of the particular colored light it receives. The electronic information output signals from the photodetectors 52, 54 and 56, in turn, are amplified respectively by amplifiers 58, 60 and 62 and thereafter converted respectively from analog format signals to digital format signals by analog-to-digital converters 64, 66 and 68. The digital electronic information signals from the converters 64, 66 and 68 are thereafter respectively directed to read only memories (ROM) 70, 72 and 74 for data compression in a well-known manner prior to transfer by way of a parallel input/output device 76 to a computer as shown generally at 110.

The computer 110 may comprise a memory 112, a central processing unit (CPU) 114 and an image enhancing block 116. The output signal from the image enhancing block 116 is thereafter directed by way of a divide circuit 118 back to the parallel input/output device 76 and then to respective read only memory circuits (ROM) 88, 90 and 92. Galvanometer drive signals are also provided from the parallel input/output device 76 by way of counters 100, 102 and digital-to-analog converters 104, 106 to the X and Y galvanometer mirrors 40 and 42, respectively. Output signals from the read only memories 88, 90 and 92, in turn, are directed respectively to digital-to-analog converters 94, 96 and 98 for conversion from a digital format back to an analog format for controlling the light modulating response of the acousto-optic modulators 18, 20 and 22 respectively.

The laser scanning and printing apparatus 10 may be operated in the following manner. An original picture which may comprise a photograph, document, painting, etc. is stationed on the picture receiving plane 48 and line scanned with a composite colored beam received from the laser light sources 12, 14 and 16. The acousto-optic modulators 18, 20 and 22 operate to maintain each laser beam light uniformly intense in the blue, green and red. The composite colored laser beam is line scanned over the two-dimensional face of the picture stationed at the picture receiving plane 48 by the XY galvanometer mirrors 40 and 42. These, in turn, are controlled in a well-known manner by way of counters 100, 102 and digital-to-analog converters 104, 106, respectively. The change in the composite colored laser light from coherent to incoherent light by the ground glass 44 operates to eliminate any speckle effect which is normally associated with coherent laser light.

The photoresponsive elements 52, 54 and 56 detect the light reflected from the original picture at the plane 48 in the three red, green and blue color components and provide corresponding analog electronic information output signals. The analog electronic information output signals are thereafter amplified by amplifiers 58, 60 and 62 and digitized by the analog-to-digital converters 64, 66 and 68, respectively. The digitized electronic information signals are thereafter compressed in the read only memories (ROM) 70, 72 and 74 prior to transfer into the computer 110 by way of th parallel input/output device 76. The digitized electronic information signal, containing tonal information in each color, is processed in any well-known manner by the circuit 116 to provide image enhancements such as color correction in a manner as described in U.S. Pat. No. 3,622,690, supra, and, as well, intensity control during exposure to electronically adjust the effective slope of the high-contrast copy material for tonal enhancements.

The digitized and enhanced electronic information signal is thereafter directed to the divide circuit 118 for division by the digitized non-enhanced electronic information signal to provide the appropriate digitized signals for controlling the acousto-optic modulators 18, 20 and 22. The digitized acousto-optic modulator control signals are thereafter directed from the computer 110 by way of the parallel input/output circuit 76 to respective read only memories (ROM) 88, 90 and 92 from whence the signals are respectively converted from digital-to-analog format by the digital-to-analog converters 94, 96 and 98.

The original picture stationed at the picture receiving plane 48 is again line scanned across the two-dimensional face thereof by the composite colored light beam modulated by the acousto-optic modulators 18, 20 and 22 in accordance with the light modulating control signals furnished by way of the digital-to-analog converters 94, 96 and 98, respectively. The XY galvanometers 40, 42 under the influence of control signals provided by way of the counters 100, 102 and the digital-to-analog converters 104, 106, respectively, effect the two-dimensional line scan of the composite colored light beam across the face of the original picture in the aforementioned manner. The rotating ground glass 44 again operates to change the composite colored laser light beam from coherent to incoherent light in order to eliminate the aforementioned speckle effect which is normally associated with coherent laser light. The light reflected from the face of the original picture at the plane 48 is thereafter directed by way of the objective lens 50 to expose the photosensitive material stationed at the film plane 51 and thereby record on the photosensitive material a duplicate image to that of the picture stationed at the picture receiving plane 48. The copy material can be either positive or negative and may be larger or smaller than the original. Where it is negative, it is usually referred to as an "internegative" and is used in a subsequent print process for making multiple copies when uniformly illuminated during subsequent exposures.

The original pictorial stationed at the plane 48 is preferably first coarsely line scanned at uniform light intensity in generally low resolution, preferably equivalent to a matrix of 128 pixels by 128 pixels. The analog electronic output information signals from the photoresponsive elements 52, 54 and 56 is, in turn, digitized by the analog-to-digital converters 64, 66 and 68 respectively to any one of 256 grey levels thereby resulting in a maximum of 48 kilobytes of image data to be processed by the computer 110. This small volume of image data can be quickly processed to provide the requisite control signals to the acousto-optic modulators 18, 20 and 22 during the succeeding line scan and printing operation in which the composite colored beam is reflected from the original picture to expose the photosensitive material at the film plane 51. High resolution image data which is not sensed during the first line scan of the original picture at uniform beam intensity is carried to the duplicate by imaging the light reflected from the original during the second line scan thereof to directly expose the photosensitive material. Such reflected light is directed by way of the objective lens 50 and operates to provide the high resolution fine-detailed exposure of the photosensitive material. The modulation of the intensity of the red, green and blue laser beams in the aforementioned manner during the second line scan of the original picture operates to effect a selective lightening or darkening of selected areas of the photosensitive material stationed at the film plane 52 in accordance with the desired image enhancements provided by the computer 110. Thus, since the composite colored scanning light beam is modulated in the aforementioned manner during the printing process to effect selective lightening or darkening of selected areas of the photosensitive material, there is in effect provided an automatic means for dodging and burning the photosensitive material in a manner affecting the desired image enhancements, both color and tonal. Since the original pictorial is first scanned in generally low resolution to provide a minimal amount of digitized image data, there is provided a simple and economical means by which digitized image data may be processed and enhanced in a minimal amount of time to enable quick and expeditious printing of a duplicate embodying select image enhancements such as improved sharpness, color saturation, color correction and tonal range.

The method is successful in accomplishing sharpness enhancement with reduced needs for both computer memory storage space and computational power because of the strategies which are used in sharing the various tasks normally present in more complicated systems for producing similar results. It is based on the recognition that luminance information in the original does not need to be acquired at the fine detail level while fine details can be reproduced by the imaging or optical system rather than by way of line scanning with narrow light sources during exposure, the practice in the past.

Consequently, it is sufficient to scan the original for luminance variations through the use of a coarse scanning technique which effectively breaks-up the original picture area into an array of 128×128 pixels. By comparison with the usual practice of breaking-up an original picture area into an array of 1000×1000 pixels, the 128×128 pixel scan is sufficiently different to allow it to be labeled as a coarse scan since the difference between the two examples is roughly a factor of 100. To put it another way, the coarse scan here occupies roughly 1% as much computer memory to store the luminance information.

Figure 2:
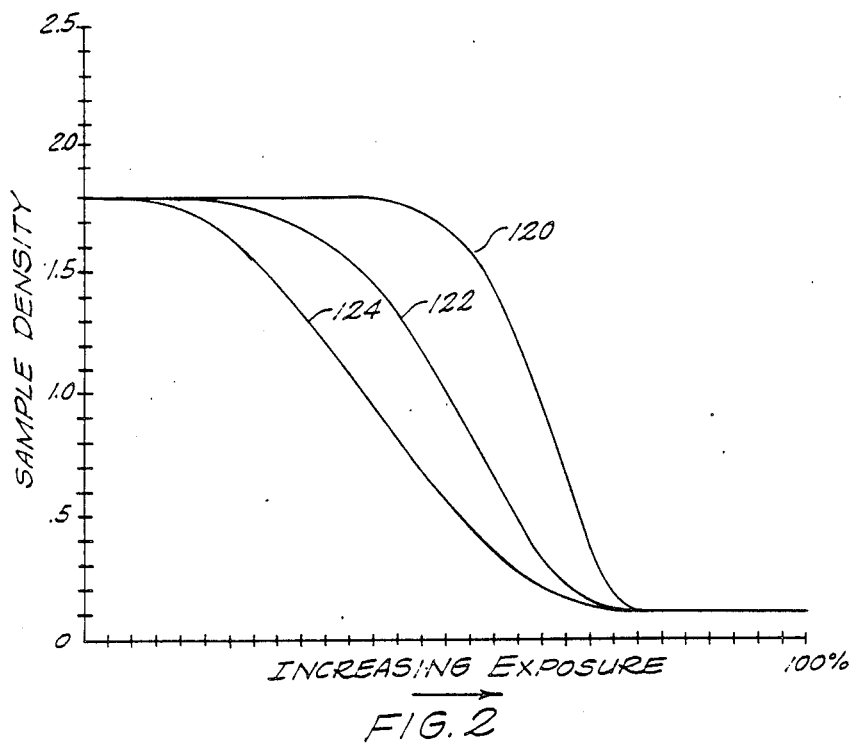
FIG. 2 is a graph schematically illustrating the sensitometric characteristics of the high-contrast copy material used in practicing the invention and the effect of electronic manipulation on those characteristics.

Once the luminance information has been gathered and stored in the computer, the computer provides an output in a well-known way that controls the amount or intensity of laser light for exposure of the copy material. In doing this, it is able to compensate for the tonal properties found in the original by electronically shaping the slope of the copy material to have an either steeper or shallower slope depending on the characteristics it finds in the tonal range of the original. If one refers to FIG. 2, the steep slope curve 20 to the right can be taken to represent the original sensitometric characteristics of the copy material while those two curves to the left of that can be taken to represent electronic equivalents of the copy material slope as modified by the intensity control of the laser light during exposure. These are curve 122 of lower slope and 124 of lowest slope. The practical effect of this in the copy is to produce a copy that has a tonal range that is more acceptable than the one in the original. If the original is a picture that looks washed-out, the computer can make the darks darker and the lights lighter in the copy, and this is equivalent to steepening the characteristic curve of the copy material, going say from curve 124 to curve 122. If, however, you have a particularly contrasty picture, you may want to tone it down by making the lights less light and the darks less dark to pick up more detail in shadowy regions. Given a copy material with any kind of grey scale, this also can be accomplished electronically—low slope can be made high slope and vice versa.

Fine detail in the original is carried by the copy lens 50 to the copy material in the usual way. Since the color and tonal areas of the original are of most concern for manipulation purposes, fine detail doesn't require much manipulation so it is desirable to, if anything, enhance it. This has been done in the past through the use of fine scanners, but the present method shows how to avoid the use of fine scanners and the associated data requirements that go along with their use.

The high-contrast copy material assures that fine detail is enhanced. When scanned with 128×128 pixels, each pixel covers roughly 1/100 of the width of the area. This may be large enough to cover several cycles of the fine detail. If it does cover several cycles, highlights in the dark places with fine detail cannot be individually detected. So, if you are boosting the contrast to take advantage of very flat negative copy material, you are not going to be able to boost fine detail and, conversely, suppressing the tonal scale of a very contrasty negative material will not suppress the tonal scale within the fine detail. The present method takes advantage of the fact that in using only 128 pixels each way, the Nyquist cut-off, which requires that you take two samples per cycle to do anything with a given frequency cycle, says that there will be no influence on the details which are finer than about 64 cycles/picture. Therefore, during exposure, since the coarse scan is not going to have any influence on spatial frequencies above 64 cycles/picture, the use of the high-contrast material enhances it, but low contrast material would suppress it.

To appreciate how the use of the high-contrast copy material enhances sharpness, it is useful to examine how high spatial frequency details in the orignal are reproduced in the peak visual region of the eye. The average person can readily see 10 or 9 or 8 cycles/mm and has a peak response to spatial detail around 2 to 4 cycles/mm as shown by curve 126 in FIG. 3. Now, a sampling frequency of 64 cycles/picture, considering an original say 80 mm square, results in a sampling rate of 0.8 cycles/mm. This is below the peak spatial frequency response of the eye, and in this region, the tonal scale manipulations determine what is done to the copy. Above this region, in the region to the right of the peak response of the eye up to about 10 cycles/mm, it is the slope of the copying material which determines how the copying material reproduces detail. Again referring to FIG. 3, there is shown by curve 128 the ability of the high-contrast copy material to reproduce spatial detail. Curve 130 represents the ability of a low-contrast copy material to reproduce spatial detail. Below a spatial frequency of about 0.8 cycles per/mm, the reproduction properties are controlled by the electronic manipulation, and are shown here as matched to each other, independent of the film contrasts. A comparison of these two curves reveals that in the region of the eye response that is considered important for apparent sharpness of the copy, the high-contrast material enhances the detail that can be copied. Therefore, above the Nyquist point, it is the slope of the film that determines how the copy is reproduced since the high-contrast material has the ability to exaggerate subtle fine detail, and it is preferable for use in these situations since low-contrast material would not similarly emphasize detail information.

In practicing the method of the invention, it is important to recognize that there is some spatial scanning rate which can be too coarse because it creates artifacts in the form of a reproduction of the scanning pattern itself. It has been estimated that a pixel scan of say 16×16 would probably produce the artifact while a 32×32 scan, equivalent to 0.2 cycles/mm for an 80 mm square pictorial, probably would not. Consequently, this spatial frequency probably represents the low end of the useable range while 0.8 cycles/mm the higher end before reaching fine as opposed to coarse scanning.

Although shown with a laser scanning apparatus for obtaining luminance and color information and for exposing, other scanning and lighting arrangements can also be used to practice the inventive method. The well-known cathode ray tube (CRT) can be employed, for example, or a continuous source segmented with a filtering array such as a partitioned liquid crystal matrix can also be usefully employed.

The higher the slope of the high-contrast material, the more useful will be its effect on sharpness enhancement. Anything above the usual copy material slope of 1.0 would be beneficial, and it is preferred to use a slope of 2.0 or greater—slopes easily obtainable.

Other embodiments of the invention, including additions, subtractions, deletions and other modifications of the preferred disclosed method of the invention will be obvious to those skilled in the art and are within the scope of the following claims.

What is claimed is:

1. A method for electronically printing copies of original pictorials, said method comprising the steps of:
    coarsely scanning the original pictorial for luminance information to establish its tonal properties;
    imaging the original pictorial on high-contrast copy material with a well-corrected copy lens;
    comparing the original's tonal properties with the sensitometric properties of the high-contrast copy material to generate a correction function for enhancing the tonal properties of the copy compared with those of the original; and
    exposing the copy material by coarsely scanning the original with a light source whose intensity is modulated in accordance with said correction function.

2. The method of claim 1 wherein the slope of said high-contrast material is greater than 1.0.

3. The method of claim 1 wherein said copy material is negative material.

4. The method of claim 1 wherein the center of the original pictorial and the optical axis of the copy lens are offset to reduce veiling glare effects.

5. The method of claim 1 wherein the coarseness of the scans is equivalent to a spatial frequency of at least 0.2 cycles/mm.

6. The method of claim 1 wherein the scan rate is equivalent to a spatial frequency equal to or less than 0.8 cycles/mm.

7. The method of claim 1 wherein the original pictorial is scanned for luminance information in three colors.

8. The method of claim 1 wherein the original pictorial is scanned for luminance information in color and is exposed with laser sources of three different colors.

* * * * *